United States Patent Office 3,499,791
Patented Mar. 10, 1970

3,499,791
QUATERNARY AMMONIUM SALT CONTAINING POLYOLEFIN COVERED ELECTRICAL CONDUCTOR
Daniel Edwin Maloney, Wilmington, Del., assignor to E. I. du Pont de Nemours and Company, Wilmington, Del., a corporation of Delaware
No Drawing. Continuation of application Ser. No. 20,533, Apr. 7, 1960. This application June 10, 1965, Ser. No. 463,032
Int. Cl. B44d 1/18; H01b 9/00, 3/30
U.S. Cl. 117—232
6 Claims

ABSTRACT OF THE DISCLOSURE

An electrical conductor having a coating of corona-resistant polyolefin resin containing from 0.1% to 2% of either a quaternary ammonium salt or a betaine.

---

This application is a continuation of U.S patent application Ser. No. 20,533, filed Apr. 7, 1960 and now abandoned.

This invention relates to a method for providing a primary insulation, particularly suitable for use with high-voltage cable, which exhibits exceptional resistance to electrical breakdown and stress-cracking under the influence of corona, and to wire conductors coated with this corona-resistant primary insulation. More particularly, this invention relates to a method for providing a primary insulation for high voltage cable which comprises covering the cable with a polyolefin resin containing, dissolved therein, an organic ionic salt of a strong acid and a strong base, or zwitter-ion compound such as a betaine.

Wire conductors, particularly high voltage cable coated with a polyethylene resin or with similar polyolefin resins such as polypropylene or copolymers of ethylene with 1-olefins, have come into extensive commercial use in recent years. However, one problem which has limited the life and the usefulness of such polyolefin resins as primary insulation for wire and high-voltage cable, has been the tendency for them to fail due to corona discharge, resulting in degradation of the primary insulation by electrically-induced stress-cracking. When coated wires or cables are wound, bent, or twisted, it has been found that the resulting stress makes them sensitive to corona, resulting in cracking of the insulation and arcing. This phenomenon will be referred to as "corona-mechanical stress cracking." Heretofore, no satisfactory solution to the problem of protecting polyolefin resin insulation on high-voltage cable from degradation through exposure to corona, has been known.

Therefore, it is an object of this invention to provide a method for preparing primary insulation for high-voltage cable which exhibits exceptional resistance to electrical breakdown and cracking under the influence of corona. Corona is herein defined as any electrically-detectable, field-intensified ionization which does not result immediately in complete breakdown of the insulation. It is another object of this invention to provide a wire conductor having a polyolefin cover resistant to corona-induced breakdown. It is a particular object of this invention to provide a polyethylene cover for a high-voltage cable which will be exceptionally resistant to electrical breakdown and cracking from exposure to corona.

It has now been discovered that the objects and advantages of this invention can be achieved by a method for preparing a primary insulation material for high-voltage cable exhibiting resistance to corona-induced breakdown and cracking which comprises blending a polyolefin resin with from 0.1% to 2% by weight of a compatible, ionic organic salt. Particularly effective ionic organic salts for this purpose are salts selected from the group consisting of the quaternary ammonium salts of acids with tetraalkyl ammoniumhydroxides in which at least one of the alkyl groups of the tetraalkyl ammonium hydroxide contains at least 8 carbon atoms, and betaines containing an alkyl substituent group having at least 8 carbon atoms. Such betaines have the formula

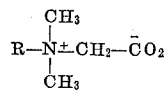

where R is an alkyl group having at least 8 carbon atoms in the chain. The acids employed with tetraalkyl ammonium hydroxide to form ionic salts are usually mineral acids, but organic acids, such as acetic acid, and acids stronger than acetic acid can be employed.

The polyolefin resins employed in the preparation of the primary insulation of the subject invention comprise a class consisting of polyethylene, polypropylene, poly-1-olefins generally, and modified polyethylene resins made by copolymerization of ethylene with 1-olefins of 4 to 10 carbon atoms. The polyolefins employed in this invention may be either low, intermediate, or high density, as defined by the ASTM, covering a range of annealed densities from about 0.89 to about 0.97. Generally, for cable coatings, resins of high molecular weight are preferred; such resins have a melt index below about 2.5 and preferably below about 1.0. The melt index is a measure of melt viscosity as defined by the ASTM in test D–1238–57T, run under Condition E (190° C., 2160 g. load). Also particularly useful in the preparation of the primary insulation of this invention are modified ethylene polymers made by copolymerization with such 1-olefins as butene-1, hexene-1, octene-1, decene-1, and the like, which polyethylene resins have annealed densities at 20° C. in the range of 0.925 to about 0.955, and melt indices below about 2.5.

The ionic organic salts employed as additives in the polyolefin resins used in the primary insulation of this invention are materials which are highly ionic and which are soluble in the polyolefin resin because of the presence of one or more long-carbon-chain alkyl groups containing at least 8 carbon atoms. The tetraalkyl quaternary ammonium salts of such mineral acids as the hydrogen halides are particularly useful, but salts of organic acids such as acetic acid and organic acids stronger than acetic acid are also suitable. Examples of such quaternary salts include octadecyltrimethylammonium chloride, dodecyltrimethylammonium chloride, dioctadecyldimethylammonium chloride, didodecyldimethylammonium chloride, and the like. In contrast with such materials, salts with a weak organic base are unsatisfactory. An example of such non-operative material is n-lauryl-pyridinium chloride. In addition to the tetraalkyl ammonium salts, compounds containing an internal ionic structure often called a zwitter-ion, have been found suitable as additives. Examples of such materials are the betaines such as n-lauryl betaine.

The compositions employed in the preparation of the primary insluation of this invention are prepared by forming a solution of the additive in the polyolefin resin. Such a solution can conveniently be prepared by blending the additive and the polyolefin resin and subsequently extruding the blend through any form of an extruder mixer. For the preparation of coated wire conductors, the blend may be extruded directly onto the wire as an insulating cover. In the preparation of cables, an extruded tape can be spirally wound on the metal conductor to form the primary insulation.

One method (Test Procedure A) for testing the corona resistance of polyolefin insulation is to extrude a 34-mil coating onto number 14 wire and wrap this in twelve turns about a 3/16 inch stainless steel rod, 6 inches long, having small electrical stress bells of insulating tape at each end, leaving 1½ inches of uncovered steel on which the wire is wrapped. For each test, six such wrapped mandrel samples are prepared and exposed to an average electrical stress of 200 volts per mil by applying 6,800 volts AC between the mandrel and the conductor. Corona is visible about the coils during the test. Failure is evidenced by the flow of a pulse of current which blows a fuse, causing a record of the time of failure to be made. The time for failure of 6 specimens is recorded F(6/6). Examination of the failed wire coating shows that the polyethylene has cracked on the outside of the coil where mechanical stress was greatest. This failure under corona is a surface effect and not an internal one. It is affected by the amount of mechanical stress and by the relative humidity of the atmosphere—high humidity favors longer life. Therefore, a controlled humidity of 50%, relative, at 73° F. is used, and great care employed to wind the mandrels uniformly under constant tension in order to achieve a reproducible test.

In order to achieve greater reproducibility in testing polyolefin insulation, a second method, Test Procedure B, was developed which employs uniaxially-stressed films. A 12-mil film is melt extruded through a flat die and water-quenched. A strip 2 inches wide and 14 inches long is clamped over a flat electrode and slowly elongated 50%, then clamped in the elongated position. Ten upper electrodes constructed of ½-inch diameter stainless steel rod having an edge radius of 1/16 inch are positioned against the upper surface of the stretched film. An electrical stress of 200 volts per mil in an atmosphere of 50% relative humidity at 73° F. is applied. The time for failure for five out of the ten is reported as F(5/10).

Both Test Procedure A and B are reported in more detail in an article entitled "A Study of the Effects of Corona on Polyethylene" by E. J. McMahon, D. E. Maloney, and J. R. Perkins in "Communications and Electronics," November 1959, at pages 654–662.

Significant improvements in the corona resistance as determined by the values for F(5/10) hours or F(6/6) hours is achieved with as little as 0.1% of a tetraalkyl ammonium halide in the polyolefin resin. The preferred concentration of additives in the polyolefin resin is from about 0.5% to about 1.5% by weight, and 2% represents a practical upper limit for the concentration of the additives.

The following examples are illustrative of the invention, but the invention is not limited to the particular resins and additives described in the examples.

EXAMPLE 1

For this example, a low-density polyethylene resin containing about 0.05% of an antioxitant was employed as the base resin for purposes of control. From this base polyethylene resin, compositions containing 0.2%, 0.5%, 1.5% by weight of octadecyltrimethylammonium chloride were prepared by blending the additives and the polyethylene resins by tumbling in a standard manner and extruding the blend through a disc mixer as 12-mil film, using a flat die and water quench. Subsequently, the films were tested by Test Procedure B, described above. The results are shown in Table 1, from which it can be seen that a major improvement in corona resistance was achieved even with as little as 0.2% of the octadecyltrimethylammonium chloride.

TABLE 1

Corona resistance of polyethylene containing octadecyltrimethylammonium chloride

| Wt. percent additive: | F(5/10) hours |
|---|---|
| None | 35 |
| 0.2 | 127 |
| 0.5 | 220 |
| 1.5 | 381 |

EXAMPLE 2

This example employed the same base resin as Example 1, but the additive used was dodecyltrimethylammonium chloride. Concentrations of 0.2%, 0.5%, and 1.5% by weight were prepared and tested as described in Example 1. The improvement in corona resistance is shown in the data of Table 2.

TABLE 2

Corona resistance of polyethylene containing dedecyltrimethylammonium chloride

| Wt. percent additive: | F(5/10) hours |
|---|---|
| None | 35 |
| 0.2 | 90 |
| 0.5 | 106 |
| 1.5 | 187 |

EXAMPLE 3

In this example, the polyethylene resin of Example 1 was blended with 1% by weight of didodecyldimethylammonium chloride and extruded as 12-mil film and tested as in Example 1. The corona resistance of this composition was measured as F(5/10) of 205 hours by Test Procedure B, as compared with 35 hours for the control.

EXAMPLE 4

The polyethylene of Example 1 was employed using n-lauryl betaine (sold by E. I. du Pont de Nemours and Company as "SCA-100"). Blends containing 0.5%, 1.0%, and 2.0% by weight of n-lauryl betaine were prepared and extruded as in Example 1. The corona resistance found on testing these films by Test Procedcre B is set forth in Table 3.

TABLE 3

Corona resistance of polyethylene containing n-lauryl betaine

| Wt. percent additive: | F(5/10) hours |
|---|---|
| None | 35 |
| 0.5 | 80 |
| 1.0 | 194 |
| 2.0 | 170 |

EXAMPLE 5

A modified polyethylene resin, made by copolymerization of 1-butene with ethylene and having an annealed density of 0.934 and a melt index of 1.6, was melt-extruded through a slit die into 12-mil tape. The corona resistance of this tape was determined by Test Procedure B; the F(5/10) value was 13 hours. Another portion of the same polyethylene resin was blended with 1% by weight of octadecyltrimethylammonium chloride and extruded into tape under the same condition. The F(5/10) value determined by Test Procedure B for this sample was 80 hours, showing a 600% improvement over the control.

EXAMPLE 6

Polyethylene coated wire was prepared from a polyethylene resin having an annealed density of 0.920 and a melt index of 2.2 by extrusion of the polyethylene at 220° C. onto #14 copper wire moving at 600 feet per minute to give a 34-mil coating. Another portion of the same polyethylene resin was blended with 1% by weight of octadecyltrimethylammonium chloride prior to extrusion; this blend then was extruded under the same conditions as for the control to give a 34-mil coating on #14 copper wire. The corona resistance of these polyethylene-insulated wires was determined by preparing six wound mandrels of each composition and testing according to Test Procedure A, as set forth hereinabove. The F(6/6) value for the control was 30 hours. The F(6/6) value for the polyethylene containing the tetraalkylammonium chloride was 200 hours; no failures occurred before 150 hours.

The polyolefin resin wire coating compositions of this invention may contain, in addition to the ionic organic additives, any of the common antioxidants employed with polyolefin resins. Pigments such as $TiO_2$ or carbon black may be employed if desired for weatherability, but such pigments generally have a deleterious effect on corona resistance, so for most applications, unpigmented resins are preferable for primary insulation.

I claim:

1. An electrical conductor having a coating of corona-resistant polyolefin resin selected from a class consisting of polyethylene, polypropylene, poly-1-olefins, and copolymers of ethylene with 1-olefins having 4 to 10 carbon atoms containing from 0.1% to 2% by weight of an ionic organic salt selected from the group consisting of the quaternary ammonium salts of acids with ionic strength at least as strong as acetic acid with tetraalkylammonium hydroxide in which at least one of the alkyl groups of the tetraalkylammonium hydroxide contains at least 8 carbon atoms, and betaines containing an alkyl substituent group having at least 8 carbon atoms.

2. The electrical conductor of claim 1 in which the ionic organic salt is a betaine, and the betaine is n-lauryl betaine.

3. The article of claim 1 in which the electrical conductor is a wire, and in which the polyolefin is polyethylene, and in which the ionic organic salt is a quaternary ammonium salt and the quaternary ammonium salt is a halide salt.

4. The coated electrical conductor of claim 1 in which the ionic organic salt is a quaternary ammonium salt of an acid with ionic strength at least as strong as acetic acid with tetraalkylammonium hydroxide in which at least one of the alkyl groups contains at least 8 carbon atoms.

5. The coated electrical conductor of claim 4 in which the quaternary ammonium salt is a halide salt.

6. The coated electrical conductor of claim 5 in which the quaternary ammonium salt is selected from the class consisting of octadecyltrimethylammonium chloride, dodecyltrimethylammonium chloride, dioctadecyldimethylammonium chloride and didodecyldimethyl ammonium chloride.

References Cited

UNITED STATES PATENTS

| | | |
|---|---|---|
| 2,408,416 | 10/1946 | Edgar et al. |
| 2,579,375 | 12/1951 | Eisen. |
| 2,729,860 | 1/1956 | Balkin et al. |
| 2,904,846 | 9/1959 | Smith. |

FOREIGN PATENTS 938,729  10/1963  Great Britain.

OTHER REFERENCES

Ralston et al., Conductivities of Quaternary Ammonium Chlorides Containing Two Long-Chain Alkyl Groups, in Journal of American Chemical Society, vol. 70: pp. 977–979, March 1948.

ALFRED L. LEAVITT, Primary Examiner

J. A. BELL, Assistant Examiner

U.S. Cl. X.R.

117—128.4, 132, 161